United States Patent
Baweja

(12) 
(10) Patent No.: US 6,216,233 B1
(45) Date of Patent: *Apr. 10, 2001

(54) MAINTAINING A MEMORY WHILE IN A POWER MANAGEMENT MODE

(75) Inventor: Gunjeet Baweja, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,930

(22) Filed: Feb. 12, 1997

(51) Int. Cl.[7] ..................................................... G06F 1/28
(52) U.S. Cl. .......................... 713/322; 713/324; 365/222; 365/226
(58) Field of Search ........................ 395/750.03, 750.04, 395/750.05, 750.06; 365/222, 193, 201, 226–227; 711/105–106; 713/320, 322, 323, 324

(56) References Cited

U.S. PATENT DOCUMENTS

| | | | |
|---|---|---|---|
| 4,586,157 | 4/1986 | Rector et al. .......................... 364/900 |
| 5,241,680 | 8/1993 | Cole et al. ............................ 395/750 |
| 5,262,998 | * 11/1993 | Mnich et al. ......................... 365/222 |
| 5,264,808 | * 11/1993 | Tanaka .................................. 331/57 |
| 5,365,487 | * 11/1994 | Patel et al. ........................... 365/226 |
| 5,388,265 | * 2/1995 | Volk ..................................... 713/300 |
| 5,390,350 | 2/1995 | Chung et al. .......................... 395/150 |
| 5,454,114 | 9/1995 | Yach et al. ............................ 395/750 |
| 5,532,968 | * 7/1996 | Lee ....................................... 365/222 |
| 5,533,123 | 7/1996 | Force et al. ............................... 380/4 |
| 5,566,117 | * 10/1996 | Okamura et al. ..................... 365/222 |
| 5,596,545 | * 1/1997 | Lin ....................................... 365/236 |
| 5,614,872 | 3/1997 | Tagiri . |
| 5,627,477 | 5/1997 | Kuroda et al. . |
| 5,628,020 | * 5/1997 | O'Brien ........................... 395/750.06 |
| 5,629,897 | * 5/1997 | Iwamoto et al. ..................... 365/195 |
| 5,634,106 | * 5/1997 | Yaezawa et al. ..................... 711/106 |
| 5,648,710 | 7/1997 | Ikeda . |
| 5,652,890 | 7/1997 | Foster et al. ......................... 395/750 |
| 5,740,454 | 4/1998 | Kelly et al. ...................... 395/750.03 |
| 5,754,867 | * 5/1998 | Walker ............................. 395/750.03 |
| 5,808,952 | * 9/1998 | Fung et al. ........................... 365/222 |
| 5,838,929 | 11/1998 | Tanikawa ............................. 395/282 |
| 5,881,016 | * 3/1999 | Kenkare et al. ................ 365/230.03 |
| 5,940,851 | * 8/1999 | Leung .................................. 711/106 |

* cited by examiner

*Primary Examiner*—Robert Beausoleil
*Assistant Examiner*—Raymond N Phan
(74) *Attorney, Agent, or Firm*—Blakely, Sokoloff, Taylor & Zafman LLP

(57) ABSTRACT

The present invention is a method and apparatus for reducing power consumption of a computer system in a suspend mode. When the computer system enters a suspend mode, the main clock is turned off and the internal oscillator is used to refresh the memory. This internal oscillator is designed such that it is only operating when the computer system is in a suspend mode. The internal oscillator is further designed such that during suspend mode, it operates only to properly refresh the memory and enter or exit the suspend mode.

24 Claims, 7 Drawing Sheets

MAINTAINING A MEMORY WHILE IN A POWER MANAGEMENT MODE

FIELD OF THE INVENTION

The present invention relates to computer systems, and more specifically, to power management in a computer system.

BACKGROUND OF THE INVENTION

Today's computer systems are often mobile. In mobile computer systems, the control of the computer system may be split up between a main processor and a mobile system controller. The mobile system controller may control a dynamic memory and a cache.

Such mobile computer systems are generally powered by batteries at least some of the time. Users expect to use their mobile computer for a long time without recharging the batteries. Today's mobile computer systems extend battery life by creating more powerful batteries and/or by decreasing power consumption of the mobile computer system. One method of decreasing the power consumption of the computer system is to have a power management mode.

A power management mode is a state in which the power consumption of the computer system is decreased. One known prior art power management mode is referred to herein as "suspend." The suspend mode may refer to a number of different states in which power consumption is reduced. However, for the purposes of this application, suspend mode refers to a state in which the primary system clock is turned off. Because the primary system clock is a high frequency clock, having a frequency in the range of 66 MHz, this results in considerable power savings. Suspend allows the computer to "go to sleep," a state in which power consumption is significantly decreased. When the computer is "woken up" from the suspend ode; it is in the same condition as it was prior to suspend. For example, if a muser is working on a word processing document when the computer goes to sleep, when the computer wakes up, it displays the same word processing document. Such information is generally stored in dynamic memory, i.e. memory that needs to be refreshed periodically. Logic that is operational during the suspend mode is used to refresh the dynamic memory and exit the suspend mode. This logic is referred to herein as suspend logic. Logic that is not operational during the suspend mode is referred to herein as normal logic.

Suspend mode is initiated by an external signal or an internal status. One prior art method of maintaining memory in a suspend mode is to have a separate clock and power connections connected to the memory that needs to be maintained and the suspend logic that maintains the memory. When the computer enters a suspend mode, the main power connection is isolated from the computer, and the main clock is stopped. A secondary power connection and a slow system clock are used to maintain the suspend logic and the memory. The slow system clock is used to indicate the refresh time. To generate the refresh cycles a faster clock is needed. In normal mode, the primary system clock is used. During suspend, instead of using the primary system clock, a slower internal oscillator is used. Exit from the suspend mode is initiated by an external signal or an internal state.

During suspend mode the power consumption of the computer system is very important. One of the components that consume power are the clocks. Driving the clock or oscillator uses power. Additionally, CMOS logic consumes power if it has a free running clock connected to it. Shutting off the clock reduces the power consumption substantially. Because the internal ring oscillator oscillates at a relatively high frequency, the oscillator and logic use a considerable amount of power. In the prior art, the power consumption of the computer system is in the range of 2–6 mW in deep suspend mode. Thus, even a small reduction, in the order of one or two milliwatts increases the battery life significantly.

Therefore, what is needed is a method and apparatus to decrease power consumption of a computer system in a suspend mode by decreasing the time during which the internal oscillator operates.

BRIEF SUMMARY OF THE INVENTION

The present invention is a method and apparatus for reducing power consumption of a computer system in a suspend mode. When the computer system enters a suspend mode, the main clock is turned off and an internal oscillator is used to refresh the memory. This internal oscillator is designed such that it is only operating when the computer system is in a suspend mode, and such that during suspend mode, it operates only to properly refresh the memory and enter or exit the suspend mode.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for power management in a mobile computer system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
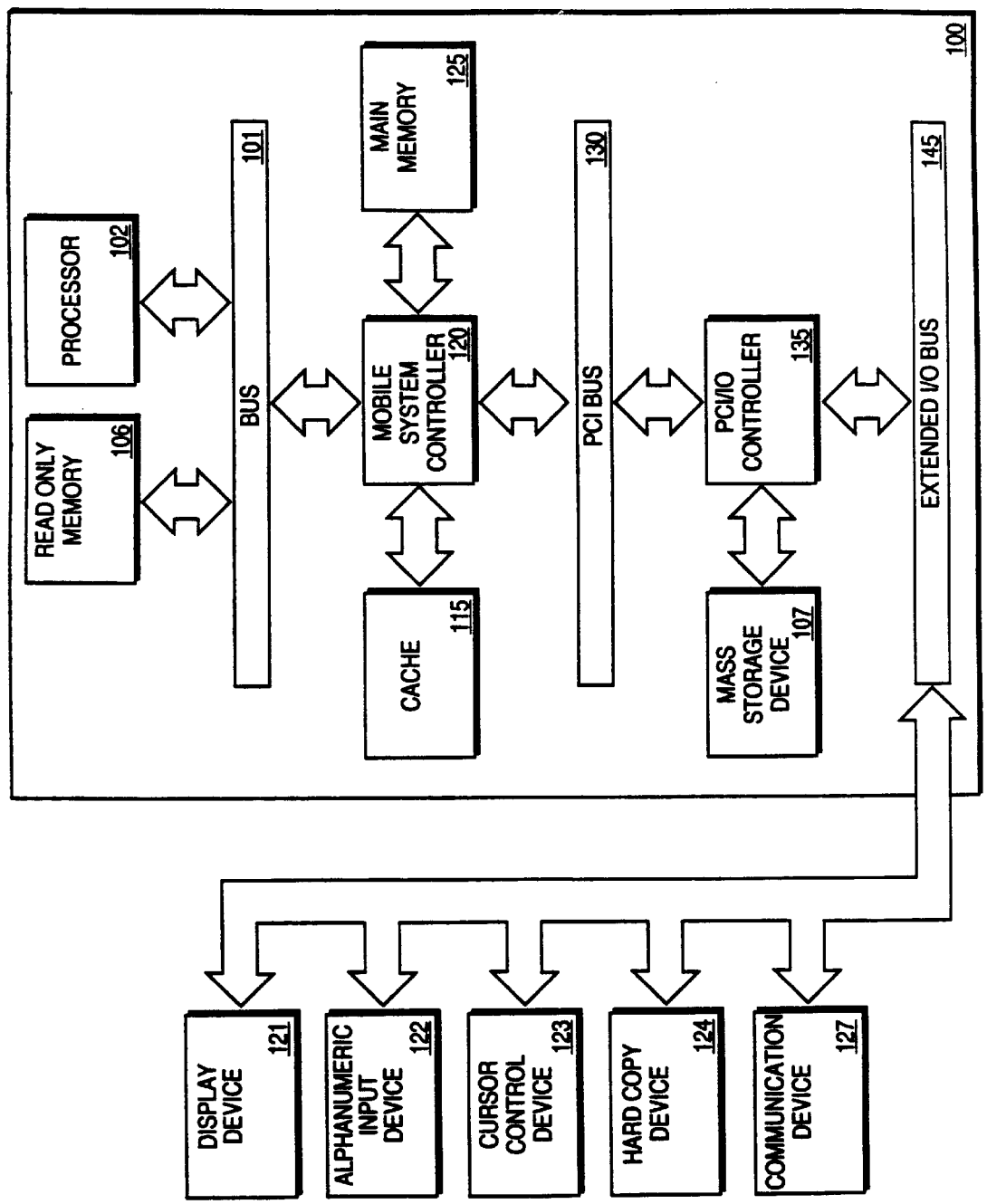
FIG. 1 is a block diagram of a conventional computer system in which the present invention may be implemented.

FIG. 1 is a block diagram of the computer system 100 in which an embodiment of the present invention can be implemented. Computer system 100 comprises a bus 101 or other communication means for communicating information, and a processor 102 coupled with bus 101 for processing information. Computer system 100 also comprises a read only memory (ROM) and/or other static storage device 106 coupled to bus 101 for storing static information and instructions for processor 102.

The computer system 100 further comprises a main memory 125, a dynamic storage device for storing information and instructions to be executed. Main memory 125 also may be used for storing temporary variables or other intermediate information during execution of instructions. In one embodiment the main memory 125 is dynamic random access memory (DRAM). The computer system 100 also comprises a cache 115 for holding recently accessed data, designed to speed up subsequent access to the same data.

Computer system 100 further comprises a mobile system controller 120 coupled to the bus 101 to control the main memory 125 and cache 115. The mobile system controller 120 includes a cache controller, a memory controller, and a bus controller. The mobile system controller 120 is coupled to a peripheral component interconnect (PCI) bus 130. The PCI bus 130 is for interconnecting with PCI components, which are well known in the art and have not been shown to avoid obscuring the present invention.

Computer system 100 also includes a PCI input/output (I/O) controller 135 for controlling the I/O access to the mass storage device 107. A mass storage device 107 such as a magnetic disk or optical disk and its corresponding disk drive can be coupled to the PCI I/O controller 135. The PCI I/O controller 135 may also be coupled to an extended I/O bus 145 for connecting input and output devices to the computer system 100. In one embodiment, the processor 102, mobile system controller 120, and PCI I/O controller 135 are separate components in the computer system 100. Alternatively, functions of these components may be combined into one or more chips.

Computer system 100 can also be coupled via I/O bus 145 to a display device 121, such as a cathode ray tube (CRT), for displaying information to a computer user. An alphanumeric input device 122 is typically coupled to I/O bus 145 for communicating information and command selections to processor 102. Another type of user input device is cursor control device 123, such as a mouse, a trackball, trackpad, or cursor direction keys for communicating direction information and command selections to processor 102 and for controlling cursor movement on display device 121. Alternatively, other input devices such as a stylus or pen can be used to interact with the display. The computer system 100 can also be coupled via I/O bus 145 to a hard copy device such as a printer. The computer system 100 may further be coupled via the I/O bus 145 to a communication device 127. The communication device 127 may be a speaker or microphone, or other device to communicate between a user and a computer system 100. Alternatively, these devices may be coupled to the computer system 100 via the PCI bus 130.

The present invention is related to power management in a computer system 100. According to one embodiment, power management is performed by computer system 100 in response to the processor 102, the mobile system controller 120 and/or the PCI I/O controller 135 executing sequences of instructions contained in main memory 125. Execution of the sequences of instructions causes the computer system 100 to enter into a suspend mode, as will be described hereafter. In alternative embodiments, circuit logic internal to the computer system 100 may be used in place of, or in combination, with software to implement the present invention. Thus, the present invention is not limited to any specific combination of hardware and software.

Figure 2:
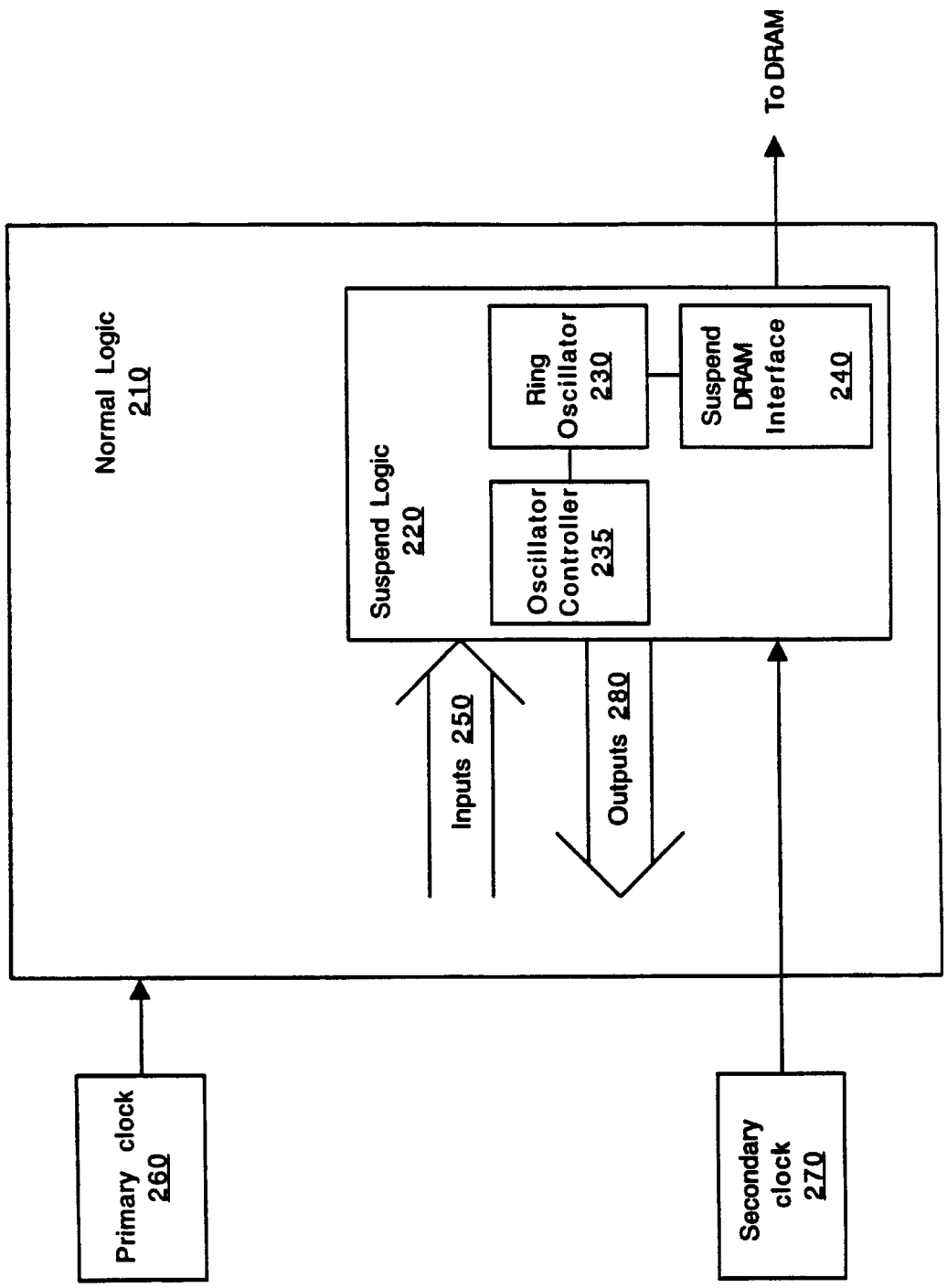
FIG. 2 is a block diagram of one embodiment of the logic blocks used in the present invention.

FIG. 2 is a block diagram of the present invention. The normal logic 210 is utilized when the computer system 100 is in the normal mode. The normal mode is the computer's normal operation, i.e. the primary power connection on and the primary clock operational, is known in the art. The suspend logic 220 acts as a part of the normal logic 210 when the computer is in normal mode. However, the suspend logic 220 controls the computer system 100 in suspend mode, and is used to refresh the memory and to exit the suspend mode. In one embodiment the suspend logic 220 is in the mobile system controller 120.

The normal logic 210 is connected to a the primary clock 260. The primary dock is a fast clock, which in one embodiment has a frequency of 66 MHz. The primary clock 260 is utilized by the entire computer system 100 during normal mode. The suspend logic 220 also has as an input the secondary clock 270. The secondary clock 270 is a slow clock, which in one embodiment has a frequency in the range of 32 KHz. The secondary clock 270 is used to time the refreshes needed by the DRAM, when the computer is in a normal mode or a suspend mode.

The suspend logic 220 includes a suspend DRAM interface 240. The suspend DRAM interface 240 controls generation of DRAM refresh cycles during the suspend mode. It is part of the normal DRAM interface used in normal mode. In one embodiment, the suspend DRAM interface 240 is designed to include the least amount of logic needed to refresh the DRAM banks. A DRAM bank is a block of DRAM cells. The present invention may be implemented using extended data out (EDO) DRAM or fast page mode (FPM) DRAM. However, it is to be understood that the present invention can be used with other types of DRAM with minor modifications that are obvious to one skilled in the art.

A ring oscillator 230 is connected to the suspend DRAM interface 240. In one embodiment, the ring oscillator 230 has a frequency in the range of 2–5 MHz. The frequency of the ring oscillator 230 depends on system characteristics. The type of DRAM used determines how often the DRAM cells have to be refreshed. The refresh rate of EDO DRAM, for example, can vary between 15 $\mu s$ and 256 $\mu s$. Depending on the frequency of refreshes, the ring oscillator 230 frequency can extend over a range. The ring oscillator 230 is also connected to an oscillator controller 235. The oscillator controller 235 is part of the suspend logic 220, and controls the turning on and turning off of the ring oscillator 230. In one embodiment, the oscillator controller 235 and ring oscillator 230 are combined in a single unit. The ring oscillator 230 may be replaced by a gated high speed clock, or any other techniques of driving the DRAM cells.

FIG. 2 also shows the inputs 250 to the suspend logic 220. The inputs 250 to the suspend logic 220 are connected to the normal logic 210 in normal mode. However, during suspend mode, the normal logic 210 is not powered. When logic is not powered, it may float or display invalid information. Therefore, the connection between the normal logic 210 and the suspend logic 220 is severed when the computer is in a suspend mode. By isolating the inputs 250 of the suspend logic 220 when the computer system is in a suspend mode, invalid inputs are avoided. The outputs 280 of the suspend logic 220 are also isolated when the computer system 100 is in suspend mode. If the outputs 280 of the suspend logic 220 are not isolated, they may result in the normal logic 210 being in an invalid state. In this state some circuits may form short circuits, leading to leakage, causing a power drain. Therefore, the outputs 280 of the suspend logic 220 have to be isolated in suspend mode.

Figure 3A:
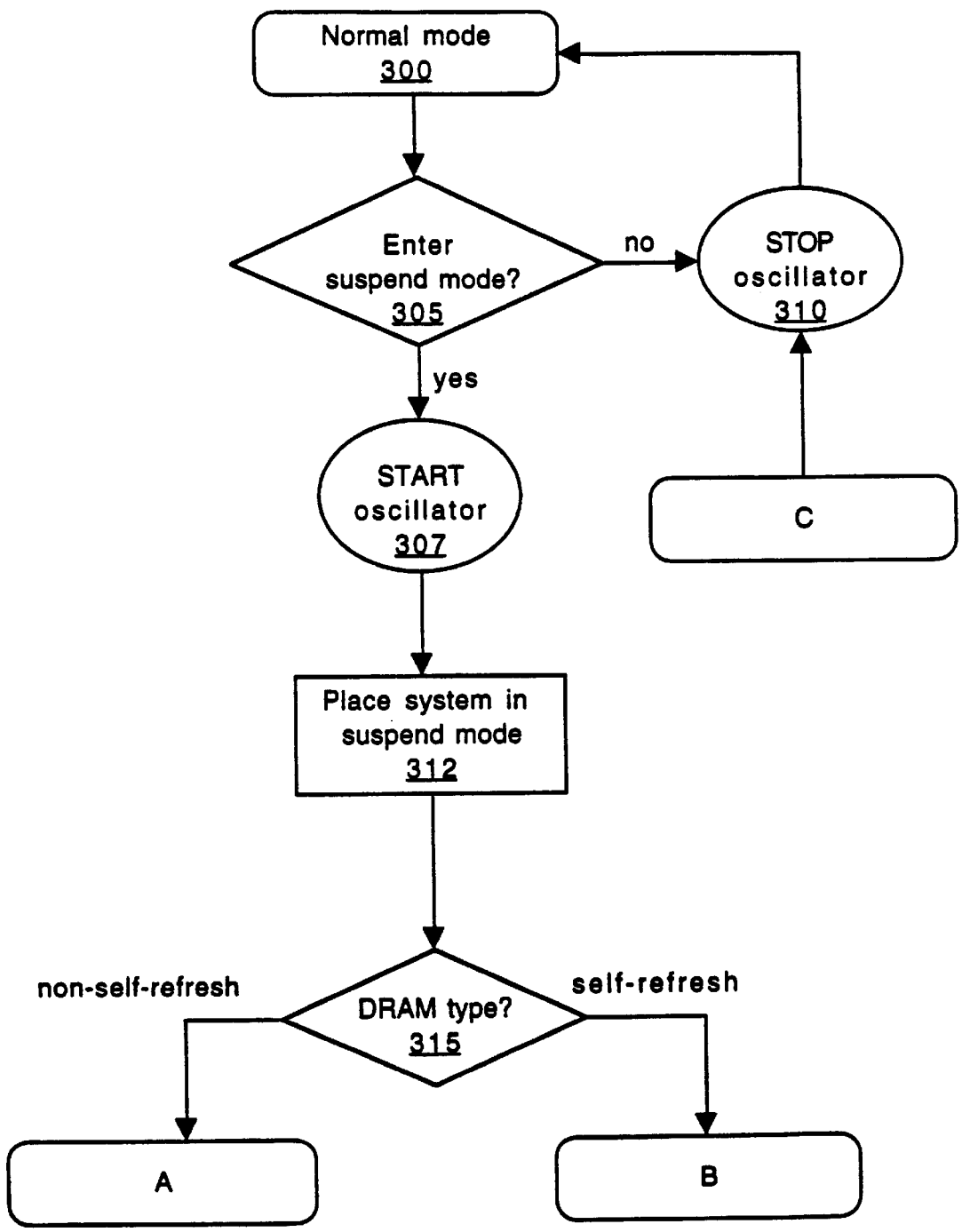
FIGS. 3A–3C are a flowchart illustrating the operation of the ring oscillator of the present invention.
Figure 3B:
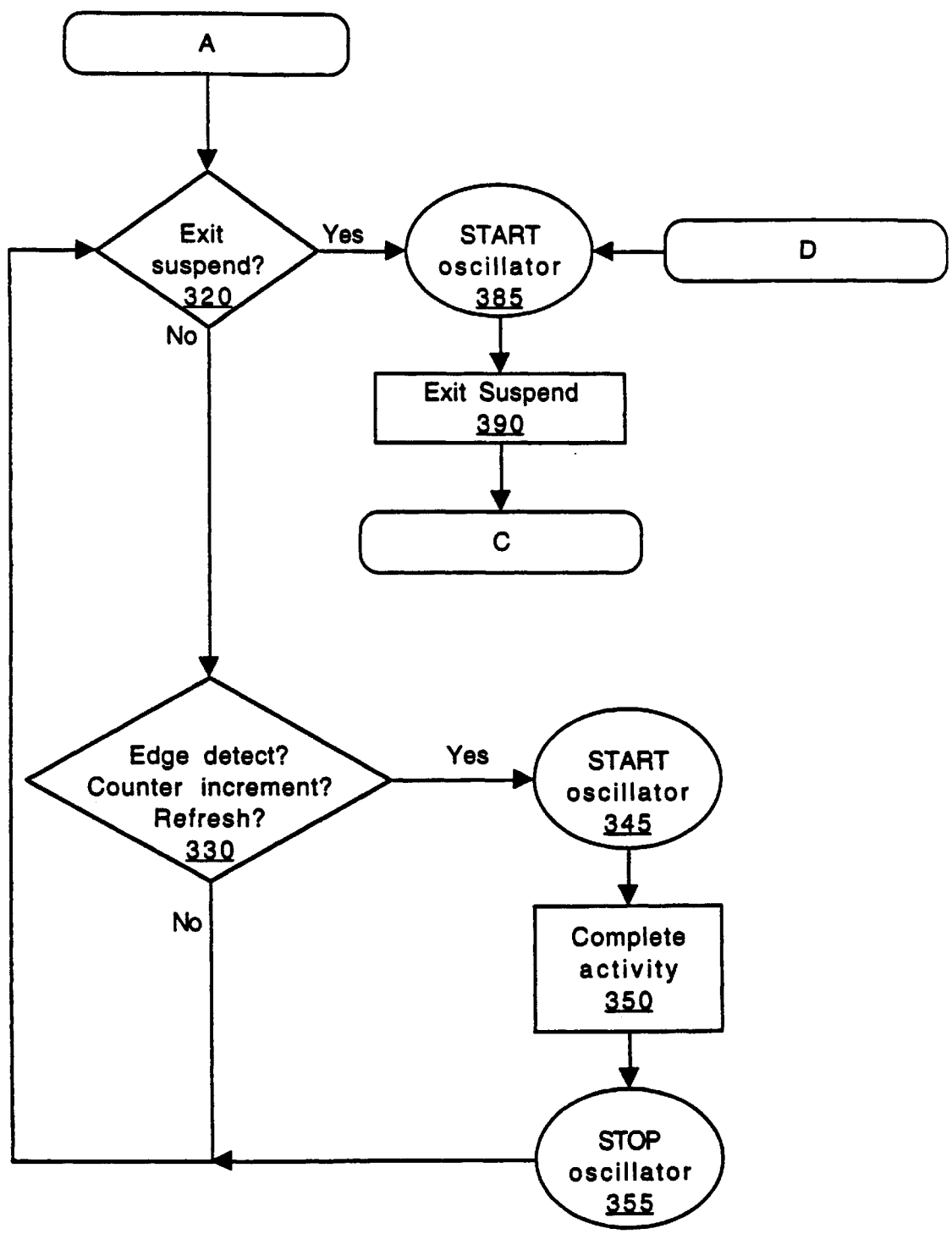
Figure 3C:
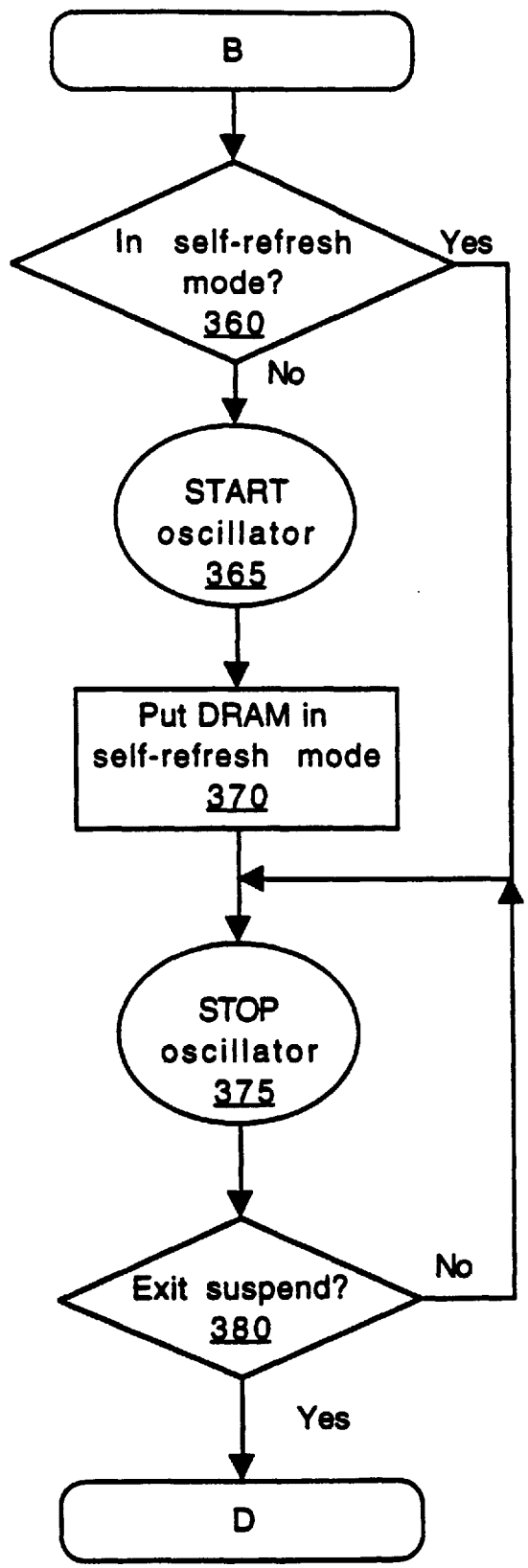

FIGS. 3A–3C together are a flow chart of the operation of the ring oscillator 230. The operation of the ring oscillator 230 is controlled by the oscillator controller 235. The oscillator controller 235 is a part of a suspend logic 220 that operates while the computer system 100 is in a suspend mode. In one embodiment the oscillator controller 235 may be included in the mobile system controller 120.

Referring to FIG. 3A, it is a flow chart of the operation of the ring oscillator 230. At block 300, the computer system is in a normal mode. In a normal mode the oscillator 230 is not operating. At block 305, the process queries whether the computer system has initiated entry into the suspend mode. If the computer system remains in the normal mode, the oscillator 230 is stopped, at block 310. Although the ring oscillator 230 may not be operating at that time, the oscillator controller 235 sends out the signal to stop the oscillator 230 to verify that the oscillator 230 is not operating. The process returns to block 300, where the computer system 100 is in a normal mode.

If entry into the suspend mode has been initiated, at block 307, the oscillator 230 is started. As described above, an external pin indicator or an internal status signal may indicate that the computer system 100 is entering or exiting the suspend mode. At block 312, the system is placed in suspend mode. Entering a suspend mode may include stopping the primary clock 260 and isolating the inputs 250 and outputs 280 of the suspend logic 220.

At block 315, the process tests what type of DRAM the computer system is using. In the example illustrated here, the DRAM is either column address strobe (CAS) before row address strobe (RAS) (CBR) refresh or self-refresh extended data out (EDO), fast page mode (FPM) or similar type of DRAM. Self-refresh DRAM is able to generate refresh cycles internally. Thus, no external control signals are required to maintain data integrity once the DRAM is placed in to self-refresh mode. Non-self-refresh types of DRAM require external control signals, including the row address strobe (RAS) and column address strobe (CAS). The present invention can utilize self-refresh or non-self-refresh DRAM. However, if any non-self-refresh DRAM is used the entire DRAM has to be treated as non-self-refresh DRAM.

Refreshing DRAM generally consists of reading a selected row into an on-chip buffer, which discharges the storage capacitors in the bit cells. The information is then written back into the selected row, thereby recharging the capacitors in the row. However, alternative techniques of refreshing DRAM may be utilized with the present invention.

Referring to FIG. 3B, the operation of the ring oscillator 230 for a CBR refresh is shown. At block 315, if the DRAM is not a self-refresh DRAM the process continues to block 320. At block 320, the process tests whether an exit suspend has been initiated. As described above, the exit from the suspend mode may be initiated by the assertion of a pin or an internal signal. If the exit suspend signal has been activated, the process continues to block 385, starting the oscillator 230. At block 390, the exit suspend process is used to exit from the suspend mode. In one embodiment, this process includes completing any pending memory refresh cycles using the suspend logic, and then transferring control to the normal logic driven by the primary clock, running at 66 MHz. Once, the exit suspend process has been completed, the process returns to block 310, stopping the oscillator 230. If no exit suspend signal was detected, the process continues at block 330.

At block 330, the controller tests whether there is a clock edge to detect, a counter to increment or a DRAM to refresh. As discussed above, the secondary clock 270 remains active and connected to the suspend logic 220 while the computer system is in a suspend mode. The secondary clock 270 has a frequency in the range of 32 KHz. The ring oscillator 230, which is has a much higher frequency than the secondary clock, is turned on to detect each clock edge of the secondary clock. The ring oscillator 230 also needs to be turned on to increment the counter and refresh the DRAM. The DRAM rows need to be refreshed at predetermined intervals. To properly time the refreshes needed by the DRAM, a counter is used. This counter is incremented with each clock edge of the secondary clock 270. When the counter reaches a predetermined value, a refresh is executed. If no activating factors are found, the process returns directly to block 320.

If one of the activities—a clock edge detect, a counter increment, or a DRAM refresh—needs to be completed, the process continues to block 345. At block 345, the ring oscillator 230 is turned on in order to complete one of the following activities: detect a clock edge, increment the counter, or refresh the DRAM. At block 350, the appropriate activity is completed. At block 355, the oscillator 230 is stopped. The process then returns to block 320, testing whether the exit suspend signal has been asserted.

Referring to FIG. 3C, the operation of the ring oscillator 230 for a self-refresh DRAM is shown. At block 315, if the DRAM is self-refresh DRAM, the oscillator controller tests whether the DRAM is already in self-refresh mode, at block 360. As described above, self-refresh DRAM is refreshed without any external control signals once it is in the self-refresh mode. If the DRAM is in self-refresh mode, process continues directly to block 375.

If the self-refresh DRAM is not in self-refresh mode, the oscillator 230 is started, at block 365. At block 370, the DRAM is placed into self-refresh mode. In one embodiment a DRAM is placed in self-refresh mode by asserting the column address strobe (CAS) and row address strobe (RAS) line of the DRAM for a predetermined time. This time is DRAM dependent, and is known to those skilled in the art.

After the DRAM has been placed in self-refresh mode, at block 370, the oscillator 230 is stopped, at block 375. The oscillator 230 is not turned on, except to exit the suspend mode. At block 380, the process tests whether the computer system has initiated an exit suspend. In one embodiment, the processor signals, via an external pin, when an exit suspend has been initiated. In one embodiment, the process tests whether the pin has been asserted. Alternatively, any other techniques of initiating or indicating an exit from the suspend mode may be used with the present invention. If the exit suspend has not been initiated, the process returns to block 375. The cycle continues, testing whether an exit suspend has been initiated, until the answer is yes. If an exit suspend has been initiated, the process continues to block 385, and continues as described above.

Figure 4:
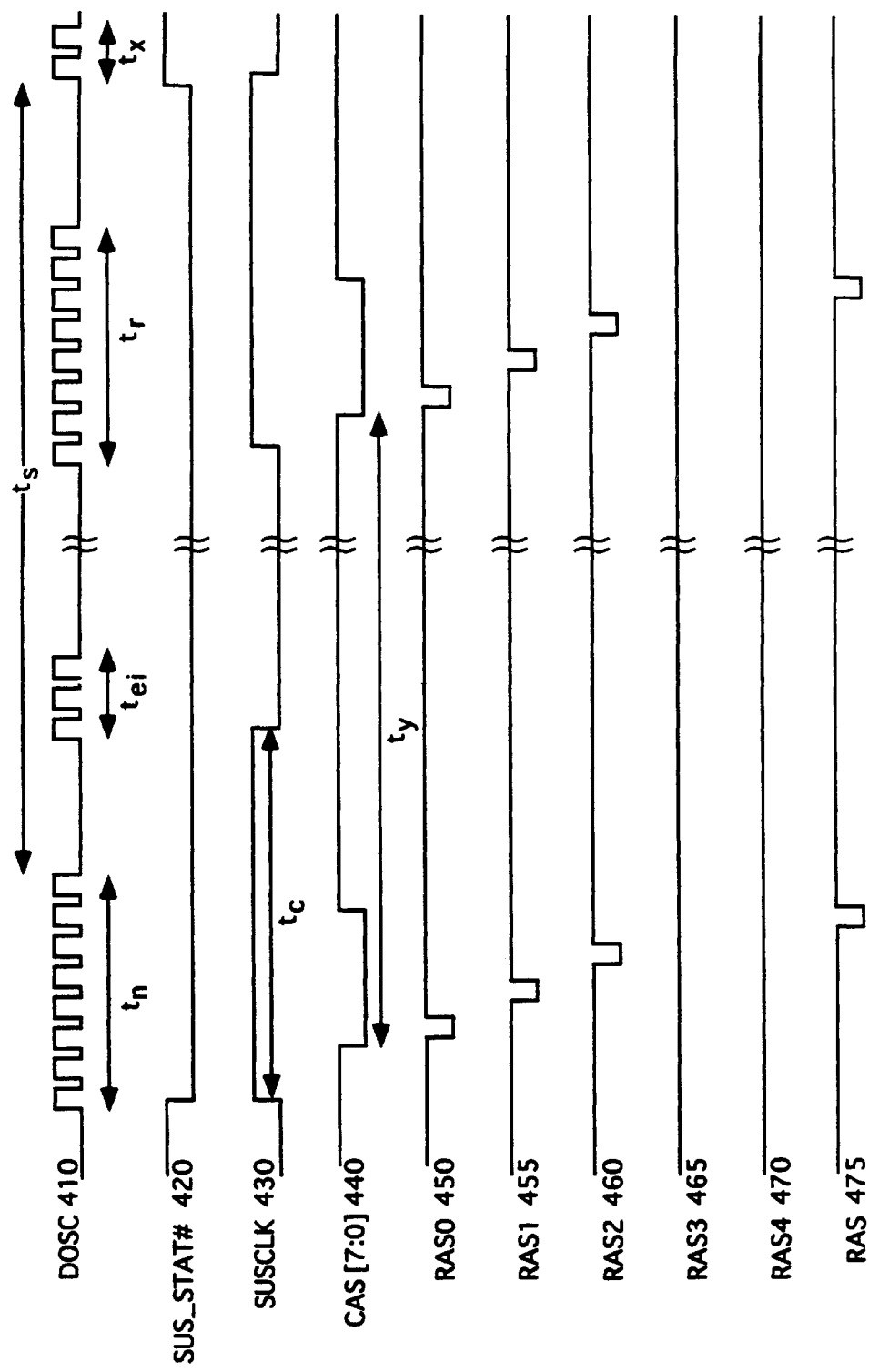
FIG. 4 is a timing wave form diagram showing a first embodiment the signals used by the present invention.

FIG. 4 is a wave form diagram of the signals used in one embodiment of the present invention. Some types of DRAM utilize CBR refresh. In CBR refresh, the device first activates the CAS and keeps it asserted while asserting RAS to the DRAM bank. Various timing parameters have to be met for the assertion of the RAS and CAS. These parameters depend on the type of DRAM used, and are well known in the art. The row addresses do not have to be asserted, as they are internally generated by the DRAM. In one embodiment, the CAS lines are shared by all DRAM banks, while each DRAM bank has its own RAS signal. FIG. 4 illustrates the signals used for a CBR refresh.

The DOSC signal 410 is generated by the ring oscillator 230. In one embodiment, the DOSC signal 410 has a frequency in the range of 2–5 MHz when the oscillator 230 is on. In one embodiment, the frequency of the DOSC signal 410 is 5 MHz, and the wavelength of DOSC signal 410 is 200 nano-seconds (ns). Because 5 MHz is the high end of the frequency for the DOSC signal 410, the example below uses that frequency and wavelength.

The SUS_STAT# signal 420 is the signal that initiates entry into and exit from the suspend mode. In one embodiment, the SUS_STAT# signal 420 is an external pin signal that is active low. In one embodiment, the PCI I/O controller asserts the SUS_STAT# signal 420 to indicate that a transition to the suspend mode is about to occur. As shown in FIG. 4, the SUS_STAT# signal 420 is high when the computer system is in normal mode, and low when the computer system is in a suspend mode or in transition between the normal mode and suspend mode.

The SUSCLK signal 430 is generated by the secondary clock 270. In one embodiment, the SUSCLK signal 430 has a frequency in the range of 32 KHz. The period $t_c$ is one half the period of the clock, which is 15.6 $\mu$s. The SUSCLK signal 430 is used to maintain a counter to indicate when a refresh is needed. The SUSCLK signal 430 is needed because the internal oscillator 230 is not accurate enough to time the refreshes of the DRAM. The SUSCLK signal 430 is active during normal mode as well as suspend mode.

The CAS signal 440 is the column address strobe signal. The RAS signals 450–475 are the six rows associated with this CAS signal 440. In one embodiment, the device has six DRAM banks. Each DRAM bank has a RAS line, RAS 450–475, associated with it. Each DRAM bank has eight CAS lines, CAS [7:0], associated with it. In one embodiment, all of the DRAM banks share the CAS lines, CAS [7:0]. It is to be understood that a different number of RAS signals 450–475 may be associated with the CAS signal 440. In the present invention, the system determines which rows of DRAM are populated. In a computer system 100 there may be multiple rows of DRAM, only some of which are populated by DRAM cells. For example, RAS3 465 and RAS4 470 are not populated in FIG. 4. If a row is not populated, the RAS associated with that row is not asserted, and that row is not refreshed. In this way, the number of oscillator 230 edges used to complete a refresh cycle are reduced.

The DOSC signal 410 is active during the transition from the normal mode to the suspend mode, indicated as $t_n$. The DOSC signal 410 is turned on when the SUS_STAT# signal 420 goes low. In one embodiment, the DRAM is refreshed during the transition period $t_n$, as is shown by the CAS signal 440 and the RAS signals 450–475. Assuming that all DRAM banks are populated, in one embodiment, the period $t_n$ is 200 ns×10=2 $\mu$s. The ten clock periods correspond to one clock period to assert the CAS signal 440, one clock period for each of six RAS lines 450–475, and three clock periods to enter into the suspend mode.

The DOSC signal 410 is active when a clock edge of the SUSCLK signal 430 needs to be detected and the counter is incremented. As discussed above, the SUSCLK signal 430 transitions are used to indicate the elapsed time. The counter, which is based on the number of transitions of the SUSCLK signal 430, is used to determine whether a refresh is needed. The time for which the DOSC signal 410 is active for clock edge detection is indicated as $t_{ei}$. In one embodiment, the period $t_{ei}$ is in the range of three clocks. Since the frequency of the DOSC signal 410 varies, the length of the period varies accordingly.

The DOSC signal 410 is also active when the DRAM needs to be refreshed. As discussed above, the counter indicates when the DRAM needs to be refreshed. The time during which the DOSC signal 410 is active to refresh the DRAM is indicated as $t_r$. The period $t_r$ depends on the number of populated rows in the DRAM being refreshed. The period $t_r$ is in the range of 3 * 200 ns to 10 * 200 ns=0.6–2 $\mu$s.

The DOSC signal 410 is active when the computer system is in transition from the suspend mode to the normal mode. This occurs when the SUS_STAT# signal 420 goes high. The time during which the DOSC signal 410 is active to exit from the suspend mode is designated $t_x$. During this period any pending refreshes are completed, and the SUS_STAT# signal 420 is deasserted. When the computer system is in a normal mode, the DOSC signal 410 is disabled.

It is understood that more than one clock edge detect, counter increment and/or DRAM refresh may occur during the suspend period, designated $t_s$. The $t_s$ period may vary from minutes to hours. In one embodiment, an clock edge detect/counter increment occurs ever 15 $\mu$s. Refreshes occur in the range of 15 $\mu$s–265 $\mu$s, depending on the type of DRAM used. Therefore, numerous clock edge detect/counter increments may occur before a DRAM refresh. The time between refreshes, $t_y$, can range from 15 $\mu$s to 256 $\mu$s. If the period $t_y$ is 256 $\mu$s, then the oscillator 230 is only active in the range of: 2 $\mu$s+(0.6 * 8 $\mu$s)=6.8 $\mu$s. Thus, the oscillator 230 is only operating for a small percentage of the total time:

$$\frac{6.8 \ \mu s}{256 \ \mu s} * 100 = 2.6\%$$

Since the power consumption is proportional to the number of clock edges in a CMOS system, the amount of power saving is considerable.

Figure 5:
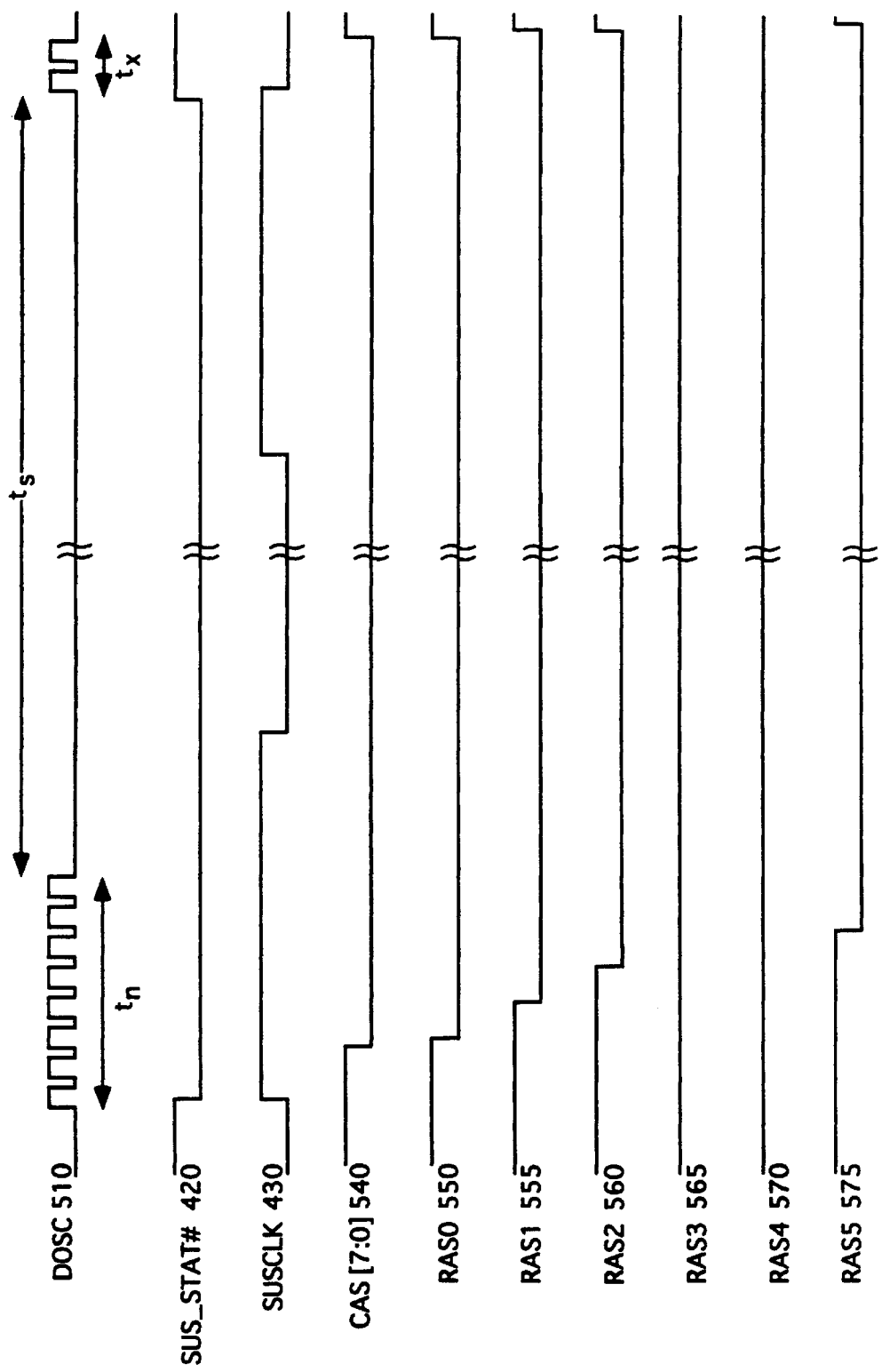
FIG. 5 is a timing wave form diagram showing a second embodiment the signals used by the present invention.

FIG. 5 is a wave form diagram of the signals used in another embodiment of the present invention. FIG. 5 illustrates signals used for a self-refresh DRAM. The SUS_STAT# signal 420 and SUSCLK signal 430 are the same signals as described above. The DOSC signal 510 is generated by the ring oscillator 230. In one embodiment the DOSC signal 510 has a frequency in the range of 2–5 MHz.

The DOSC signal 510 is active during the transition from the normal mode to the suspend mode, indicated as $t_n$. The DOSC signal 510 is turned on when the SUS_STAT# signal 420 goes low. During the transition period $t_n$ the DRAM is placed into self refresh mode. As described above, this is done by asserting the CAS 540 and those RAS 550–575 that correspond to populated rows for a period of time. The period $t_n$ is reduced by asserting only those RAS 550–575 that correspond to populated rows. For example, in FIG. 5, RAS3 565 and RAS4 570 are not populated. Therefore, neither RAS3 nor RAS4 is asserted, and the period $t_n$ is thus reduced. In one embodiment, the period $t_n$ can range from 0.6 $\mu$s to 2 $\mu$s. After period $t_n$, the DRAM is in self-refresh mode, and the DOSC signal 510 is turned off. The DOSC signal 510 does not need to operate while the computer system is in a suspend mode, indicated as $t_s$. Because the DRAM is a self-refresh, no external signals are needed to refresh the DRAM.

The DOSC signal 510 is turned on again when the computer system is transitioning from the suspend mode to the normal mode. This occurs when the SUS_STAT# signal 420 goes high. The time during which the DOSC signal 510 is active to exit from the suspend mode is designated $t_x$. During the exit the SUS_STAT# signal 420 is deasserted and control is transferred to the normal logic. Hence, as can be seen from FIG. 5, the total time $t_s$ can be hours. The period $t_n$, if all banks are populated, will be approximately 2 $\mu$s, which is negligible compared to the time that the computer system is in the suspend state. Thus, the present invention results in a major reduction in power consumption during suspend, extending the battery life significantly. Further, during normal operation the oscillator 230 is shut off, reducing power consumption during normal mode.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The present invention should not be construed as limited by such embodiments and examples, but rather construed according to the following claims.

What is claimed is:

1. A method of reducing power consumption in a computer system while maintaining a memory when the computer system is in a suspend mode, the method comprising:
   turning off a first clock utilized by said computer system when said computer system is not in said suspend mode;
   utilizing an internal oscillator in the computer system to refresh said memory,
      refreshing the memory comprising:
         determining which of a plurality of row address strobes is associated with a populated row of memory;
         asserting a column address strobe; and
         asserting only those of the plurality of row address strobes that are associated with the populated rows of memory, thereby refreshing the populated rows;
   turning off the internal oscillator in the computer system when said memory is not being refreshed.

2. The method of claim 1, wherein turning on said internal oscillator is dependent on an internal counter reaching a predetermined number.

3. The method of claim 1 wherein said memory is a dynamic random access memory (DRAM).

4. The method of claim 1 wherein said internal oscillator is turned off when said computer system is not in said suspend mode.

5. The method of claim 1, wherein said memory is a non-self-refreshing DRAM.

6. The method of claim 2 wherein said internal oscillator is turned on to increment said internal counter.

7. The method of claim 2 further comprising turning on said internal oscillator at a transition of a slow second clock for detecting a clock edge.

8. The method of claim 7 wherein said internal counter is incremented in response to said transition of said slow second clock.

9. The method of claim 3 wherein said DRAM is a CAS-before-RAS DRAM.

10. The method of claim 3 wherein said DRAM is a self-refreshing DRAM.

11. The method of claim 1 wherein said memory consists of a column address strobe and a plurality of row address strobes and wherein refreshing said memory comprises:
    determining which of said plurality of row address strobes is associated with a populated row of memory;
    asserting said column address strobe; and
    asserting only those of said plurality of row address strobes that are associated with said populated rows, thereby refreshing said populated rows.

12. A method of reducing power consumption in a computer system while maintaining a dynamic memory when the computer system is in a suspend mode, said method comprising the computer implemented steps of:
    turning off a first clock, said first clock utilized by said computer system when said computer system is not in said suspend mode;
    turning on an internal oscillator in the computer system to detect a clock edge of a slow second clock, and then turning off said internal oscillator in the computer system;
    turning on said internal oscillator in the computer system to increment a counter in response to said clock edge of said second slow clock being detected, and then turning off said internal oscillator in the computer system; and
    refreshing said dynamic memory when said counter reaches a predetermined number, said step of refreshing including the steps of:
    turning on said internal oscillator in the computer system;
    refreshing said dynamic memory; and
    turning off said internal oscillator in the computer system.

13. An apparatus for reducing power consumption in a computer system while maintaining a memory when the computer system is in a suspend mode, comprising:
    a first clock used by said computer system, when said computer system is not in said suspend mode, said first clock being off when said computer system is in said suspend mode;
    an internal oscillator in the computer system turned on to refresh said memory in said computer system, the memory comprising a column address strobe and a plurality of row address strobes, each of said plurality of row address strobes associated with a row of memory, wherein only those of said pluralities of row address strobes that are associated with populated rows are asserted, and only said populated rows are refreshed; and
    said internal oscillator in the computer system being off when said computer is not in said suspend mode.

14. The apparatus of claim 13, wherein said internal oscillator is only turned on when said memory needs to be refreshed.

15. The apparatus of claim 13 wherein said memory is a dynamic random access memory (DRAM).

16. The apparatus of claim 13 wherein said internal oscillator is turned off when said computer system is not in said suspend mode.

17. The apparatus of claim 13, wherein said memory is a non-self-refreshing DRAM.

18. The apparatus of claim 14 wherein when said internal oscillator is turned on when an internal counter reaches a predetermined number.

19. The apparatus of claim 18 wherein said internal oscillator is turned on to increment said internal counter.

20. The apparatus of claim 18 further comprising:
    a slow second clock; and
    said internal oscillator being turned on at a transition of said slow second clock to detect a clock edge.

21. The apparatus of claim 20 wherein said internal counter is incremented in response to said transition of said slow second clock.

22. The apparatus of claim 15 wherein said DRAM is a CAS-before-RAS DRAM.

23. The apparatus of claim 15 wherein said DRAM is a self-refreshing DRAM.

24. The apparatus of claim 13, wherein said memory comprises:
    a column address strobe;
    a plurality of row address strobes, each of said plurality of row address strobes associated with a row of memory, wherein only those of said pluralities of row address strobes that are associated with populated rows are asserted, and only said populated rows are refreshed.

* * * * *

UNITED STATES PATENT AND TRADEMARK OFFICE
CERTIFICATE OF CORRECTION

PATENT NO.   : 6,216,233 B1
DATED        : April 10, 2001
INVENTOR(S)  : Gunjeet Baweja It is certified that error appears in the above-identified patent and that said Letters Patent is hereby corrected as shown below:

Column 1,
Line 36, delete "ode" and insert -- mode --.
Line 37, delete "muser" and insert -- user --.

Column 9,
Line 60, delete " the computer implemented steps of".

Signed and Sealed this

Twenty-seventh Day of August, 2002

*Attest:*

*Attesting Officer*

JAMES E. ROGAN
*Director of the United States Patent and Trademark Office*